(12) United States Patent
Jambrosic et al.

(10) Patent No.: US 11,719,145 B2
(45) Date of Patent: Aug. 8, 2023

(54) EXHAUST GAS HEATER SYSTEM

(71) Applicant: Purem GmbH, Neunkirchen (DE)

(72) Inventors: Kresimir Jambrosic, Reichenbach (DE); Veronique Guerin, Stuttgart (DE); Anton-Bogdan Popescu, Laichingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/900,036

(22) Filed: Aug. 31, 2022

(65) Prior Publication Data

US 2023/0063358 A1 Mar. 2, 2023

(30) Foreign Application Priority Data

Sep. 1, 2021 (DE) ..................... 10 2021 122 577.9

(51) Int. Cl.
*F01N 3/20* (2006.01)
*F01N 5/02* (2006.01)

(52) U.S. Cl.
CPC .............. *F01N 3/2013* (2013.01); *F01N 5/02* (2013.01); *F01N 2240/16* (2013.01)

(58) Field of Classification Search
CPC ....... F01N 3/2013; F01N 5/02; F01N 2240/16
See application file for complete search history.

(56) References Cited

U.S. PATENT DOCUMENTS

| | | | | |
|---|---|---|---|---|
| 4,456,457 A * | 6/1984 | Nozawa | ................. | F01N 3/027 55/482 |
| 4,662,911 A * | 5/1987 | Hirayama | ............... | F01N 3/027 55/482 |
| 4,723,973 A * | 2/1988 | Oyobe | .................... | F01N 3/027 60/303 |
| 5,053,603 A * | 10/1991 | Wagner | .................... | H05B 3/76 219/205 |
| 2017/0273146 A1* | 9/2017 | Everly | ...................... | H05B 3/06 |
| 2019/0234266 A1* | 8/2019 | Bartolo | ................... | F01N 3/027 |
| 2020/0309006 A1* | 10/2020 | Gidney | ................. | F01N 3/2066 |
| 2021/0156289 A1* | 5/2021 | Kurpejovic | ........... | F01N 3/2013 |
| 2022/0074333 A1* | 3/2022 | Hoeckel | .................. | F23J 15/08 |
| 2022/0290595 A1* | 9/2022 | Uysal | .................... | F01N 3/2013 |

FOREIGN PATENT DOCUMENTS

DE     10 2019 131 556 A1    5/2021

* cited by examiner

*Primary Examiner* — J. Todd Newton
(74) *Attorney, Agent, or Firm* — Walter Ottesen, P.A.

(57) ABSTRACT

An exhaust system for an internal combustion engine includes an exhaust gas heater housing, an exhaust gas heater disposed in the exhaust gas heater housing and an exhaust gas treatment unit housing which, via an upstream end region, adjoins a downstream end region of the exhaust gas heater housing. At least one exhaust gas treatment unit is disposed in the exhaust gas treatment unit housing. At least one exhaust gas heater includes at least one connector element that, in the downstream direction toward the exhaust gas treatment unit housing, extends toward the exhaust gas heater and, in an exhaust gas primary flow direction, overlaps with the upstream end region of the exhaust gas treatment unit housing and/or with an exhaust gas treatment unit disposed in the upstream end region of the exhaust gas treatment unit housing.

12 Claims, 1 Drawing Sheet

EXHAUST GAS HEATER SYSTEM

CROSS REFERENCE TO RELATED APPLICATION

This application claims priority of German patent application no. 10 2021 122 577.9, filed Sep. 1, 2021, the entire content of which is incorporated herein by reference.

TECHNICAL FIELD

The present disclosure relates to an exhaust system for an internal combustion engine.

BACKGROUND

In order to ensure in exhaust systems assigned to internal combustion engines that system regions passed through by a flow of exhaust gas, in particular exhaust gas treatment units such as, for example, catalytic converters or particle filters, can be rapidly brought to an operating temperature when an internal combustion engine is started up, it is known for exhaust gas heaters to be used upstream of exhaust gas treatment units in exhaust systems of this type, so as to, as a result, be able to utilize the reactions to be carried out by exhaust gas treatment units of this type generally at comparatively high temperatures as fast as possible after starting up the internal combustion engine, the exhaust gas heaters transmitting heat to the flow of exhaust gas discharged by an internal combustion engine so as to transmit this heat to subsequent downstream system regions via the exhaust gas flow and to faster bring the downstream system regions to an operating temperature.

SUMMARY

An object of the present disclosure is to provide an exhaust system that is of a compact construction and efficiently utilizes the available installation space.

According to the disclosure, this object is achieved by an exhaust system for an internal combustion engine and this exhaust system includes:
an exhaust gas heater housing,
at least one exhaust gas heater disposed in the exhaust gas heater housing,
an exhaust gas treatment unit housing which by way of an upstream end region adjoins a downstream end region of the exhaust gas heater housing
at least one exhaust gas treatment unit disposed in the exhaust gas treatment unit housing,
wherein at least one exhaust gas heater includes at least one connector element that in the downstream direction toward the exhaust gas treatment unit housing extends toward the exhaust gas heater and in an exhaust gas primary flow direction overlaps with the upstream end region of the exhaust gas treatment unit housing and/or with an exhaust gas treatment unit disposed in the upstream end region of the exhaust gas treatment unit housing.

As a result of a connector element of this type extending in an overlapping manner into a system region that in terms of the exhaust gas primary flow direction follows downstream, or extending so as to overlap with this region in the exhaust gas primary flow direction, respectively, these mutually adjoining system regions, thus the exhaust gas heater housing having the components provided therein and the exhaust gas treatment unit housing having the components provided therein, can be disposed closer to one another. This leads to a compact construction mode, or an efficient utilization of the installation space available for an exhaust system of this type, respectively.

In order to provide space for the at least one connector element, it is proposed that the at least one connector element has an overlap extent portion that in the exhaust gas primary flow direction overlaps with the exhaust gas treatment unit and/or the exhaust gas treatment unit housing, and that the exhaust gas treatment unit housing, at least in one extent region of the overlap extent portion of the at least one connector element, does not cover the exhaust gas treatment unit on the external circumferential side thereof, the exhaust gas treatment unit being disposed in the upstream end region of the exhaust gas treatment unit housing.

To this end, the exhaust gas treatment unit housing in the extent region of the overlap extent portion of the at least one connector element can have an overlap extent portion receptacle clearance that is open in the upstream direction, for example.

In order for an exhaust gas heater to be connected to a voltage source generally disposed outside the exhaust system, one contact unit assigned to each connector element for electrically contacting the latter can be provided on the exhaust gas heater housing.

In order for the available installation space to be efficiently utilized, at least one, preferably each, contact unit assigned to a connector element can furthermore be disposed on a portion of the exhaust gas heater housing that in the exhaust gas primary flow direction overlaps with the exhaust gas treatment unit housing and/or with the exhaust gas treatment unit disposed in the upstream end region of the exhaust gas treatment unit housing.

In order to prevent any mutual interference between a connector element and an exhaust gas treatment unit here, it is proposed that the exhaust gas heater housing has a contact unit support convexity assigned to at least one, preferably each, contact unit, and that at least one, preferably each, contact unit on the exhaust gas heater housing is supported in the region of the assigned contact unit support convexity.

At least one, preferably each, contact unit support convexity in the exhaust gas primary flow direction here can at least partially overlap with the upstream end region of the exhaust gas treatment unit housing and/or with the exhaust gas treatment unit disposed in the upstream end region of the exhaust gas treatment unit housing.

In order to be able to easily position the two housings that are mutually successive or mutually adjoining in the exhaust gas primary flow direction, thus the exhaust gas heater housing and the exhaust gas treatment unit housing, in the case of a defined flow management, it is proposed that the exhaust gas heater housing in the housing portion thereof that receives the at least one exhaust gas heater and provides the downstream end region is elongate in the direction of an exhaust gas heater housing longitudinal axis, and that the exhaust gas treatment unit housing in the housing portion thereof that receives the at least one exhaust gas treatment unit and provides the upstream end region is elongate in the direction of an exhaust gas treatment unit housing longitudinal axis.

A compact construction mode here can be facilitated in that the exhaust gas treatment unit housing by way of the upstream end region thereof is positioned so as to engage in the downstream end region of the exhaust gas heater housing.

The at least one exhaust gas heater can include at least one heating conductor, wherein a first one of the connector elements is connected in an electrically conducting manner to a first connector portion of the at least one heating conductor or provides the latter, and/or a second one of the connector elements is connected in an electrically conducting manner to a second connector portion of the at least one heating conductor or provides the latter.

For highly efficient heating of exhaust gas flowing in the exhaust system, the at least one exhaust gas heater can include two heating conductors that are electrically connected in series and successively disposed in the exhaust gas primary flow direction. The first connector portion here can be provided in one of the heating conductors successively disposed in the exhaust gas primary flow direction, and the second connector portion can be provided in another one of the heating conductors successively disposed in the exhaust gas primary flow direction.

For heating exhaust gas across the entire flow cross section, at least one, preferably each, heating conductor can be configured so as to, in the manner of a plate, extend substantially orthogonally to the exhaust gas primary flow direction.

BRIEF DESCRIPTION OF THE DRAWINGS

The invention will now be described with reference to the drawings wherein.

DESCRIPTION OF THE PREFERRED EMBODIMENTS

Figure 1:
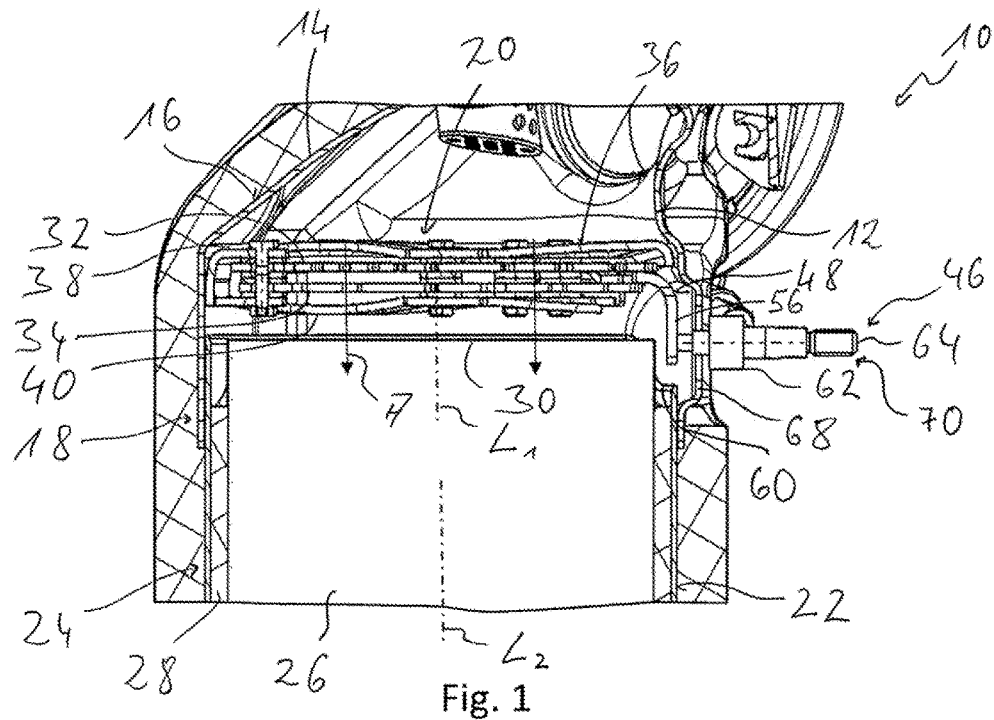
FIG. 1 shows a longitudinal sectional view of an exhaust gas heater housing of an exhaust system, having an exhaust gas treatment unit housing inserted in the downstream end region of the exhaust gas heater housing; and, FIG. 2 shows the exhaust gas heater housing in a perspective view, having an exhaust gas heater disposed in a downstream end region of the exhaust gas heater housing.
Figure 2:
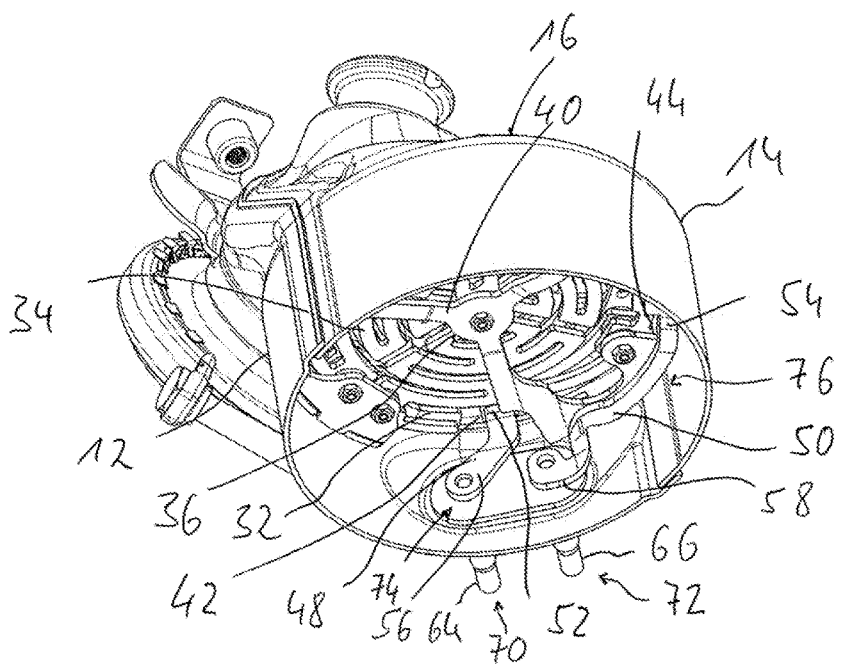

A portion of an exhaust system is illustrated in the longitudinal section in FIG. 1, the exhaust system generally being provided with the reference sign 10.

The portion of the exhaust system 10 illustrated in FIG. 1 indicates an exhaust gas heater housing 16 which is constructed using two housing shells 12, 14, for example, and which in an approximately cylindrical, downstream end region 18 that is substantially elongate in the direction of an exhaust gas heater housing longitudinal axis $L_1$ supports an exhaust gas heater which is generally provided with the reference sign 20.

The exhaust gas heater housing 16 of the exhaust system 10, in the downstream end region 18 of the former, is adjoined by an exhaust gas treatment unit housing 22 having the substantially cylindrically configured upstream end region 24 that is elongate in the direction of an exhaust gas treatment unit housing longitudinal axis $L_2$ of the exhaust gas treatment unit housing 22. The exhaust gas heater housing longitudinal axis $L_1$ and the exhaust gas treatment unit housing longitudinal axis $L_2$, in the end regions 18, 24 which are positioned so as to mutually engage and in which the exhaust gas heater housing 16 and the exhaust gas treatment unit housing 22 can be configured with a circular cross section, for example, can be disposed so as to be mutually parallel, in particular coaxial, and the exhaust gas heater housing 16 and the exhaust gas treatment unit housing 22 in the regions that are disposed so as to mutually overlap can be fixedly connected in a gas-tight manner by welding.

An exhaust gas treatment unit 26, constructed using a monolith, for example, is disposed in the exhaust gas treatment unit housing 22 and fixedly held in the exhaust gas treatment unit housing 22 by a support assembly 28, for example one or a plurality of fibrous battens, or the like, that surrounds the exhaust gas treatment unit 26 substantially on the entire external circumference of the latter such that an upstream end of the exhaust gas treatment unit 26 preferably terminates so as to be substantially flush with an upstream end of the exhaust gas treatment unit housing 22.

The exhaust gas treatment unit 26 can be constructed as an oxidation catalytic converter or as a particle filter, for example, wherein the monolith of the exhaust gas treatment unit 26 can be coated and/or constructed using a catalytically effective material. The exhaust gas which, in the region of the exhaust gas heater housing 16 that is adjacent to the exhaust gas treatment unit housing 22, in an exhaust gas primary flow direction A corresponding substantially to the orientation of the two longitudinal axes $L_1$, $L_2$ that are mutually coaxial, for example, is to flow from the exhaust gas heater housing 16 through the exhaust gas heater 20 toward the exhaust gas treatment unit 26, in the region of an end face 30 of the exhaust gas treatment unit 26 that faces the exhaust gas heater 20, can enter the pore structure of the exhaust gas treatment unit 26 and herein be subjected to the catalytic reaction to be provided by the exhaust gas treatment unit 26 on the surface created in the exhaust gas treatment unit 26.

The exhaust gas heater 20 in the embodiment illustrated includes two heating conductors 32, 34 which are successively disposed in the exhaust gas primary flow direction A, or in the direction of the exhaust gas heater housing longitudinal axis $L_1$, respectively. Each of these heating conductors 32, 34 is configured in the manner of a plate and thus extends substantially in a direction or plane, respectively, orthogonal to the exhaust gas heater housing longitudinal axis $L_1$, or to the exhaust gas primary flow direction A, respectively. For example, the two heating conductors 32, 34 can be produced by being cut out of a flat blank of a metallic material, the latter being heated when an electric voltage is applied and an electric current thus flows therethrough. Alternatively, the heating conductors 32, 34 could also be provided by winding a wire-type heating conductor in a helical or meandering manner, wherein a winding of this type, or generally the structure of the heating conductors 32, 34, respectively, can be of such a type that the winding or structure extends in a conical or frustoconical manner in the direction of the exhaust gas heater housing longitudinal axis $L_1$, for example.

The exhaust gas heater 20 furthermore includes a support assembly 36 by way of which the exhaust gas heater 20 is established on the inside of the exhaust gas heater housing 16. The support assembly 36 on the two axial sides of the two heating conductors 32, 34 includes substantially plate-type support elements 38, 40, that is, lying substantially in a plane orthogonal to the exhaust gas heater housing longitudinal axis $L_1$, which are from formed sheet-metal elements, or formed by cutting sheet-metal elements from a flat blank, for example. One of the two support elements 38, 40 is axially angled in the external circumferential region thereof, and by way of this angled region established on the internal surface of the exhaust gas heater housing 16, for example in a materially integral manner by welding, for example.

Insulation elements for electrical isolation are disposed between the two heating conductors 32, 34 as well as between the latter and the support elements 38, 40, the insulation elements being constructed using ceramics, for example. The strong cohesion of the exhaust gas heater 20 can be achieved by a plurality of threaded bolts, or the like, that pass through the support elements 38, 40, the heating conductors 32, 34 and also the insulation elements that support those in an electrically isolated manner.

The two heating conductors 32, 34 in the embodiment illustrated are connected in series. This means that each of the two heating conductors 32, 34, which can be constructed with heating conductor portions that run by way of a meandering structure, for example, has one connector end which is connected in an electrically conducting manner to a connector end of the respective other heating conductor. Each heating conductor 32, 34 in this instance has a further connector end 42, 44, wherein the two heating conductors 32, 34 connected in series, by way of a contact assembly 46 visible in FIG. 1, are connected in an electrically conducting manner to a voltage source, for example to the battery provided in a vehicle, by way of these connector ends 42, 44.

In order for this electrically conducting connection to be generated, each connector end 42, 44 is assigned one connector element 48, 50 which is constructed from a sheet-metal material, for example. Each connector element 48, 50 has a connection portion 52, 54 that is attached to an assigned connector end 42, 44 of the heating conductors 32, 34 by a materially integral connection, for example, thus by welding or brazing/soldering, for example, as well as an overlap extent portion 56, 58 that from the connection portion is angled away in the direction of the exhaust gas primary flow direction A, or of the longitudinal axes $L_1$, $L_2$, respectively, and thus extends toward the exhaust gas treatment unit housing 22. The two overlap extent portions 56, 58, in the exhaust gas primary flow direction A, or in the direction of the two longitudinal axes $L_1$, $L_2$, respectively, so as to be mutually adjacent in the circumferential direction extend axially beyond the support assembly 36 into the extent region of the contact assembly 46, or also of the exhaust gas treatment unit housing 22, respectively. In order to make this possible, the exhaust gas treatment unit housing 22 has an overlap extent portion receptacle clearance 60 that is assigned to the two overlap extent portions 56, 58 and is open in the direction of the exhaust gas treatment unit housing longitudinal axis $L_2$ and in the upstream direction. The exhaust gas treatment unit 26 on the external circumference thereof in the region of the overlap extent portion receptacle clearance 60 is not covered by the exhaust gas treatment unit housing 22. The support assembly 28 in this region also has a clearance so as to make space for receiving the overlap extent portions 56, 58. The latter in the axial direction thus overlap with the exhaust gas treatment unit 26 disposed in the upstream end region 24 of the exhaust gas treatment unit housing 22, and in the axial direction, or in the circumferential direction, respectively, overlap with the exhaust gas treatment unit housing 22.

So as to be assigned to each overlap extent portion 56, 58, the contact assembly 46 includes an electrically conducting contact element 64, 66 that is supported by a contact support assembly 62 on the exhaust gas heater housing 16. The end portions of the contact elements 64, 66 that are exposed within the exhaust gas heater housing 16 are inserted in a respectively assigned opening in the respective overlap extent portion 56, 58, for example, and in this region fixedly connected to the assigned overlap extent portion 56, 58 in a materially integral manner, for example by welding or brazing/soldering.

In order to be able to dispose the overlap extent portions 56, 58 at a sufficient axial spacing from the external side of the exhaust gas treatment unit 26, a radial molding that provides a contact unit support convexity 68 is provided on the exhaust gas heater housing 16 in that region in which the contact support assembly 62 is supported on the latter, the contact unit support convexity 68 at least partially overlapping with the upstream end region 24 of the exhaust gas treatment unit housing 22. The contact assembly 46 in the region of the contact unit support convexity 68 is thus positioned so as to be displaced radially farther outward. In this way, sufficient installation space is provided for the electrical contacting of each of the overlap extent portions 56, 58 and each of the contact elements 64, 66 that in conjunction with the contact support assembly 62 provide a respective contact unit 70 or 72, respectively.

By providing the connector elements 48, 50 it is made possible that the positioning of the contact assembly 46 can be chosen so as to be substantially independent of the positioning of the exhaust gas heater 20 in the direction of the exhaust gas heater housing longitudinal axis $L_1$. At the same time, there is the possibility to position the exhaust gas treatment unit 26 so as to be displaced farther upstream in the direction of the exhaust gas heater 20, so that the available installation space can be efficiently utilized. By virtue of the contact assembly 46 being displaced farther radially outward here, any mutual interference between the connector elements 48, 50 and the exhaust gas treatment unit 26 is avoided, even when taking into account the production tolerances which inevitably arise in the construction of exhaust systems 10 of this type.

Finally, it is to be pointed out that the most varied modifications can be performed on the construction described above without departing from the fundamental concept of the present disclosure. In this way, the exhaust gas treatment unit housing 22 could in principle be configured to be shorter in such a manner that the exhaust gas treatment unit 26 projects beyond the exhaust gas treatment unit housing 22 in the entire upstream end region 24, for example, and thus is not covered by the exhaust gas treatment unit housing 22 not only in the region of a clearance but in the entire circumferential region. The two connector elements 48, 50, or the overlap extent portions 56, 58 thereof, respectively, could be mutually positioned at a larger circumferential spacing so that the exhaust gas treatment unit housing 22, so as to be assigned to each of the overlap extent portions 56, 58, has a separate overlap extent portion receptacle clearance 60. Also, the contact units 70, 72, or the contact elements 64, 66 thereof, respectively, could be disposed at a larger circumferential spacing, and also be disposed in different axial regions of the exhaust gas heater housing 22, for example, and be provided on separate contact unit support convexities 68 assigned thereto by way of separate contact support assemblies 62, for example.

It is furthermore to be pointed out that the exhaust gas heater 20 could also be constructed having only a single, for example substantially plate-type heating conductor, or could have more than two heating conductors succeeding one another in the exhaust gas primary flow direction A, for example. In an embodiment with a plurality of heating conductors, the latter could also be disposed in parallel so that each connector element 48, 50 that provides a connector portion 74, 76 in this instance is connected in an electrically conducting manner to a plurality of connector ends of these heating conductors. Alternatively, the connector elements 48, 50, or at least one of the connector elements 48, 50, could be configured as an integral component part of one or optionally different heating conductors, so that a respective connector portion 74, 76 utilized for connecting to one of the contact units 70, 72 is not provided by a separate component but by a portion of a heating conductor that also provides a respective connector end 42, 44.

It is understood that the foregoing description is that of the preferred embodiments of the invention and that various changes and modifications may be made thereto without departing from the spirit and scope of the invention as defined in the appended claims.

What is claimed is:

1. An exhaust system for an internal combustion engine, the exhaust gas system conducting exhaust gas in an exhaust gas primary flow direction (A) and comprising:
    an exhaust gas heater housing having a downstream end region;
    at least one exhaust gas heater disposed in said exhaust gas heater housing;
    an exhaust gas treatment unit housing having an upstream end region adjoining said downstream end region of said exhaust gas heater housing;
    at least one exhaust gas treatment unit being disposed in said exhaust gas treatment unit housing;
    said at least one exhaust gas heater having at least one connector element; and,
    said at least one connector element extending in a downstream direction toward said exhaust gas treatment unit housing and, in said exhaust gas primary flow direction (A), overlapping at least with one of the following:
        i) said upstream end region of said exhaust gas treatment unit housing; and,
        ii) said at least one exhaust gas treatment unit disposed in said upstream end region of said exhaust gas treatment unit housing.

2. The exhaust system of claim 1, wherein said at least one connector element has an overlap extent portion that, in said exhaust gas primary flow direction (A) overlaps with at least one of the following:
    i) said exhaust gas treatment unit; and,
    ii) said exhaust gas treatment unit housing; and,
    wherein said at least one exhaust gas treatment unit housing, at least in one extent region of said at least one connector element, does not cover said exhaust gas treatment unit on an outer peripheral end thereof; and,
    said exhaust gas treatment unit is disposed in said upstream end region of said exhaust gas treatment unit housing.

3. The exhaust system of claim 2, wherein said exhaust gas treatment unit housing, in said extent region of the overlap extent portion of said at least one connector element, has an overlap extent portion receptacle clearance that is open in the upstream direction.

4. The exhaust system of claim 1, further comprising a contact unit including an electrically conducting contact element assigned to said connector element for electrically contacting said connector element; and, said contact unit is provided on said exhaust gas heater housing.

5. The exhaust system of claim 4, wherein said contact unit is disposed on a portion of said exhaust gas heating housing; and, said contact unit, in said exhaust gas primary direction flow (A), overlaps with at least one of the following:
    i) said exhaust gas treatment unit housing; and,
    ii) said exhaust gas treatment unit disposed in said upstream end region of said exhaust gas treatment unit housing.

6. The exhaust system of claim 4, wherein said exhaust gas heater housing has a contact unit support convexity assigned to said contact unit; and, wherein said contact unit on said exhaust gas heater housing is supported in the region of the assigned contact unit support convexity.

7. The exhaust system of claim 6, wherein said contact unit support convexity in said exhaust gas primary flow direction (A) at least partially overlaps with i) the upstream end region of said exhaust gas treatment unit housing; and, ii) the exhaust gas treatment unit disposed in said upstream end region of said exhaust gas treatment unit housing.

8. The exhaust system of claim 1, wherein said exhaust gas heater housing in the housing portion thereof that receives said at least one exhaust gas heater and has said downstream end region is elongate in a direction of an exhaust gas heater housing longitudinal axis ($L_1$); and, wherein said exhaust gas treatment unit housing in said housing portion thereof that receives said at least one exhaust gas treatment unit and has said upstream end region is elongate in the direction of an exhaust gas treatment unit housing longitudinal axis ($L_2$).

9. The exhaust system of claim 1, wherein said exhaust gas treatment unit housing via said upstream end region thereof is positioned so as to engage in said downstream end region of said exhaust gas heater housing.

10. The exhaust system of claim 1, wherein said connecting element is a first connecting element and wherein said exhaust gas system comprises a second connecting element; said at least one exhaust gas heater includes at least one heating conductor; said first conductor element is electrically connected to a first connector portion of said at least one heating conductor or provides the latter; and/or, said second connector element is electrically connected to a second connector portion of said at least one heating conductor or provides the latter.

11. The exhaust system of claim 10, wherein said at least one exhaust gas heater includes two heating conductors that are electrically connected in series and successively disposed in said exhaust gas primary flow direction (A); said first connector portion is provided in one of said heating conductors successively disposed in said exhaust gas primary flow direction (A); and, said second connector portion is provided in another one of said heating conductors successively disposed in said exhaust gas primary flow direction (A).

12. The exhaust system of claim 10, wherein said at least one heating conductor is configured so as to, in the form of a plate, extend substantially orthogonally to said exhaust gas primary flow direction (A).

* * * * *